of Rhode Island

United States Patent Office 3,102,808
Patented Sept. 3, 1963

3,102,808
COMPOSITION FOR SELECTIVELY STRIPPING ELECTROPLATED METALS FROM SURFACES
Mark Weisberg, Providence, R.I., and Florence P. Butler, Amherst, Mass., assignors, by direct and mesne assignments, to Eltex Research Corporation, a corporation of Rhode Island
No Drawing. Filed Jan. 29, 1959, Ser. No. 789,772
3 Claims. (Cl. 75—97)

This invention relates to an improved composition and method for stripping a nickel coating from a base on which it is deposited.

It is a fundamental problem in virtually any electroplating establishment to salvage defectively plated articles, because often the major economic value is in the article and any solution which can selectively remove the plated coating from the base will be useful. Again, purely as a matter of economics, the more rapidly the solution will function and the more selective it can be made, the more valuable it will be. This is simply because it relieves the operators of paying close attention to the functioning of a stripping bath if the bath can be made so selective as to remove the electrodeposited metal and to remain passive to the base metal.

In prior copending applications we have described selective stripping solutions for removing plate from electroplated articles which solutions are characterized by their containing an amino compound or nitrogen compound in combination with a nitro compound. There is a wide field of applicability of this kind of solution and it has the decided virtue of being quite selective in the removal of nickel from bases. The details of the composition are described in copending applications, Serial No. 686,577, filed September 27, 1957, and Serial No. 668,858, filed July 1, 1957, now United States Patent 2,937,490, issued May 24, 1960.

It is a fundamental object of this invention, however, to provide a means for rendering such metal stripping compositions markedly more effective in their removal of the plated material and also substantially as markedly more selective in their removal.

It is another object of the invention to provide novel compositions for stripping electrodeposited metals, which compositions are characterized by their containing ammonium compound, nitro compound and an additive agent for making the solution selective in its application.

Other objects and advantages of the invention will in part be obvious and in part appear hereinafter.

The invention, accordingly, is embodied in compositions and method for stripping electrodeposited metals from metal bases wherein the stripping medium consists essentially of a base, preferably aqueous, containing ammonium compound and an organic nitro compound in certain preferred ratios in combination with a sulfur compound in the medium, which will furnish sulfide anions, that is anions of sulfur in the -2 oxidation state, in that medium. We have found that sulfur added to the solution in a form selected from any of the following classifications is useful.

(I) Elemental sulfur
(II) Metallic sulfides:
Sodium, potassium, lithium, calcium, strontium, barium, etc.
(III) Aliphatic nitrogen sulfur compounds:
(1) Thioureas—
Thiourea, diethyl thiourea, dibutyl thiourea
(2) Thiocarbamates—
Sodium diethyl dithiocarbamate, dithane
(3) Thioamines—
Monoethylthiourea, monomethylthiourea
(4) Thioamides—
Thioacetamide, thiopropionamide
(5) Thiuram sulfides—
Tetramethyl thiuram disulfide
(IV) Aromatic nitrogen sulfur compounds:
(1) Mercaptobenzothioazoles—
Mercaptobenzothiazole
(2) Thiazyls—
Benzothiazyl disulfide, di-isopropyl-benzothiazyl 2 sulfenamide
(V) Thioacids and their salts:
(1) Thioorganic acids—
Thiomalic acid, thioacetic acid, thioglycollic, etc.
(2) Thiocyanates—
Ammonium, sodium, potassium, etc.
(3) Thiosulfates—
Ammonium, sodium, potassium, etc.
(VI) Nonmetallic sulfides:
(1) Carbon disulfides
(2) Sulfur halides—
$S_2Cl_2$, $SCl_2$, $SBr_2$, etc.

These sulfur compounds have in common the property that in the ammonium or ammonium base solution containing the nitro compound they will yield sulfur in -2 oxidation state. That is, when dissolved they give the sulfide ion directly, or by decomposition. Thus, elemental sulfur dissolves slightly to give sulfide ions; alkali metal sulfides and alkaline earth metal sulfides are the prominent examples of sources of sulfide ions; heavy metal sulfides, even though nominally insoluble in water can be used, because the trace of sulfide ion obtained in water is usually sufficient to trigger the acceleration sought in the stripping baths. Organic sulfur compounds provide the sulfide ion by hydrolysis.

The mechanism of the reaction appears to demand the presence of sulfur in -2 oxidation state in that compounds having sulfur in the elevated oxidation state, that is sulphonates and sulphites, do not function at all or are poor accelerators.

Sulfur in combination with ethylenediamine stripping compositions functions as an active accelerator of the stripping operation.

In the stripping of electrodeposited nickel from surfaces a problem frequently arises when the nickel is deposited on a thin copper base. Although it is possible to strip the nickel relatively easily with only trace damage to the copper plate or copper base, it has been found from experience that unless the inhibition of the stripping agent on copper is virtually quantitatively effective, the trace amounts of copper entering the solution poison the nickel stripping bath so that its activity as measured by the rate of stripping is markedly reduced. Hence, the problems of most effectively stripping nickel from electrodeposited surfaces are not simple, because the nickel surface which is accompanied by the light undercoating of copper, carries with it the dual aspect of accelerating nickel removal and inhibiting copper removal.

We have found that not only is elemental sulfur useful in combination with the nitro organic compound content as an accelerator, but also combinations in which the final product will greatly enhance the acceleration such as mixtures of sodium hydroxide, carbon disulfide, and ethylenediamine will be useful. Other sulfur compounds which mutually enhance each other are benzothiazole sulfides and thiuram disulfides in conjunction with the thiocarbamates. Similarly, metallic hulfides are useful provided they will release trace amounts of hydrogen sulfide in water.

In evaluating various compositions useful in accordance with this invention, tests were made with a standard solution prepared as follows: 37.5 milliliters of 50 percent ethylenediamine aqueous solution were blended with 25 milliliters of aqueous solution of ammonium salt of nitro benzoic acid in water. The whole was then made up to total of 220 milliliters. All results in the following tabulation were obtained at ambient temperatures up to 80° to 90° C.; the baths are quite useful even though they are functioning at lower temperatures or at temperatures as high as boiling. All tests were made on nickel plate deposited on a copper base.

In the following tabulation it will also be observed that the copper base in some cases shows a slight change in weight. This is directly attributable to the formation of a protective film and is indicated in the tabulation by a plus sign. It is also to be observed that the more copper which is removed in the given unit of time the less the amount of nickel removed in that time. This may be taken as a measure of the poisoning effect of the copper. That is, the objective is to strip nickel and to leave the copper or to minimize copper loss. The copper loss or poisoning is diminished by including in the bath certain materials, especially the thiocarbamates. That is, the thiocarbamates appear not only to function as accelerators to the nockel stripping but as simultaneous inhibitors of the copper stripping.

dissolution which projected to one hour is virtually ten times that of the unaccelerated solution.

In general, similar results were obtained with the sampling of various sulphur compounds reported in the table. That is, reduced to a comparable basis of concentration and quantity of additive agent, in general, it was found that the use of as little as a small fraction of one percent of the addition agent ranging down to amounts approaching a few thousandths of 1 percent up to a maximum amount of 3 to 5 percent, the rate of solution of the electrodeposited nickel would be increased by a factor of ten or more with no significant alteration of either the rate or quantity of copper brought into solution. In certain cases, namely, in cases of the aliphatic nitrogen sulfur compounds, the alkylene thioamines and amides, it was found that not only was the acceleration of stripping accomplished, but that the solution of copper was measurably and significantly suppressed.

In the tabulation compounds illustrating the several classifications of sulfur compounds mentioned have been listed. In general, any compound coming within any of these classes having at least sufficient water solubility in the presence of the ammonia and ethylenediamine produces sulfur in the -2 oxidation state in the solution and, accordingly, thereby accelerates the stripping of the nickel from the surface.

| Example number | Activator | Amount | Time | Amount of metal stripped (grams) | |
|---|---|---|---|---|---|
| | | | | Copper | Nickel |
| 1 | None | | 1 hr | | .1390 |
| | | | 2 hr | | .2100 |
| | | | 3 hr | | .3670 |
| 2 | NaDEDTC | .5 gm | 5 hr | +.0006 | 4.4761 |
| | | .2 gm | 5 hr | +.0006 | 4.5737 |
| 3 | NH₄CNS | 17.7 gm | 15 min | | .2454 |
| 4 | Diethylthiourea | 50 mg | 15 min | .0068 | .1937 |
| 5 | Benzothiazyl,N,N-Diethyl Thiocarbamyl Sulfide | .5 gm | 1 hr | .0226 | 2.1279 |
| | | | 4¾ hr | .0254 | 3.9285 |
| 6 | Di-isophrpyl Benzothiazyl, 2 Sulfenamide | .5 gm | 15 min | .0356 | .7017 |
| | | | 1½ hr | .0726 | 2.8784 |
| 7 | Na₂S | .5 gm | 4 hr | .1512 | 2.7106 |
| | | 1 gm | 4 hr | .3404 | 1.6294 |
| 8 | Thioacetamide | .5 gm | ½ hr | | .1800 |
| 9 | Tellurium DEDTC | .5 gm | 1 hr | +.0140 | 2.3822 |
| 10 | Mercapto Benzothiazole, Dibutyl Thiourea | 1 gm | 1 hr | .0032 | 1.5692 |
| | | | 1¼ hr | .0005 | 2.2967 |
| 11 | Sulfur 10 gm., EDA 100 gm. heated to 80° C. (designated as sulfur activator) | .1 cc | 30 min | | 1.7332 |
| | | | 1½ hr | | 3.3688 |
| | | | 5 hr | | 4.4424 |
| 12 | Na₂S₂O₃ 1 gm., Water 100 cc., HCl (to pH 3.0) | 1 cc | 10 min | | .278 |
| | | 2 cc | 10 min | | .372 |
| 13 | NaDEDTC, Diethylthiourea | .5 gm | 5 hr | .0003 | 4.6897 |
| | | 20 mg | | | |
| 14 | Benzothiazl Disulfide, NaDEDTC, 25% sol | 1 cc | 2 hr | .0015 | 2.2525 |
| | | | 5½ hr | .0057 | 4.1658 |
| 15 | EDA 12 gm., NaOH 8.0 g., H₂O 15.0 g., CS₂ 7.6 gr. (designated Dithane) | .8 gm | 4¾ hr | .0930 | 3.9035 |
| 16 | Dithane | 1.25 gm | 4¾ hr | .1437 | 1.9233 |
| | Na₂S | .5 gm | | | |
| 17 | Dithane | 3.98 gm | 4¾ hr | .0738 | 4.3997 |
| | NaDEDTC | .5 gm | | | |
| 18 | Benzothiazyl Disulfide Sulfur Activator | .5 gm | 7½ hr | .0062 | 3.9086 |
| | | .1 cc | | | |
| 19 | Tetramethyl-thiuramdi-sulfide | .5 gm | 3¼ hr | .0018 | 3.0954 |
| | Sulfur Activator | .1 cc | | | |
| 20 | Thiomalic | 0.1 gm | 15 min | | 0.25 |

Abbreviations:
 EDA—Ethylenediamine.
 DEDTC—Diethyldithiocarbamate.

The test results of the first example wherein the standard solution was employed utilizing no activator, show that an adequate rate of stripping is obtained whether the time of stripping was one, two or three hours. Essentially, this is without significant attack on the copper base. In general, the solution should strip at least 0.05 gram per hour if it is to be of real commercial value.

In test #2 it will be noted that the addition of a small amount of the carbamate compound, in a period of several hours, produced the dissolution of a very substantial quantity of nickel. Inasmuch as the rate of dissolution is virtually a linear function of time it will be apparent that the rate of dissolution is at least five times that of the unaccelerated solution.

In test #3 the ammonium thiocyanate shows a rate of

What is claimed is:

1. A composition for selectively dissolving nickel in the presence of a metal on which the said nickel has been electrodeposited, characterized by its containing the combination of a nitro substituted organic compound and an amine, said combination being in the liquid phase and containing at least about 0.01 percent by weight of said active combination, and a small amount of a sulfur compound which, in aqueous solution will yield sulfur ions in a -2 oxidation state, said sulfur compound being present in small amount at least sufficient to accelerate stripping of said nickel up to about 5 percent of said active combination.

2. The composition of claim 1 in which the nitro compound corresponds to the formula RNO₂, wherein R is selected from the group consisting of aromatic and aliphatic radicals, and the amine is selected from the group consisting of alkyl amines, cycloalkyl amines, alkylenediamines, alkylene triamines, cycloalkylene diamines and triamines, substituted primary, secondary and tertiary amines and diamines, and the sulfide ion source is selected from the group consisting of elemental sulfur, metal sulfides, aliphatic nitrogen sulfur compounds, aromatic nitrogen sulfur compounds, thioacids and their salts, and non-metallic sulfides.

3. A composition useful for stripping nickel coating from a base metal which comprises, in liquid phase, a nitro aromatic compound and an amine, in a molar ratio of about 1 mole of nitro radical to about 4 moles of amine, together with a small but effective amount up to 5 percent of a sulfide ion source, said source being a metal sulfide.

References Cited in the file of this patent
UNITED STATES PATENTS 2,132,511 Hentrich _____ Oct. 11, 1938
2,698,781 Meyer _____ Jan. 4, 1955

FOREIGN PATENTS 750,803 Great Britain _____ June 20, 1956